Patented June 1, 1943

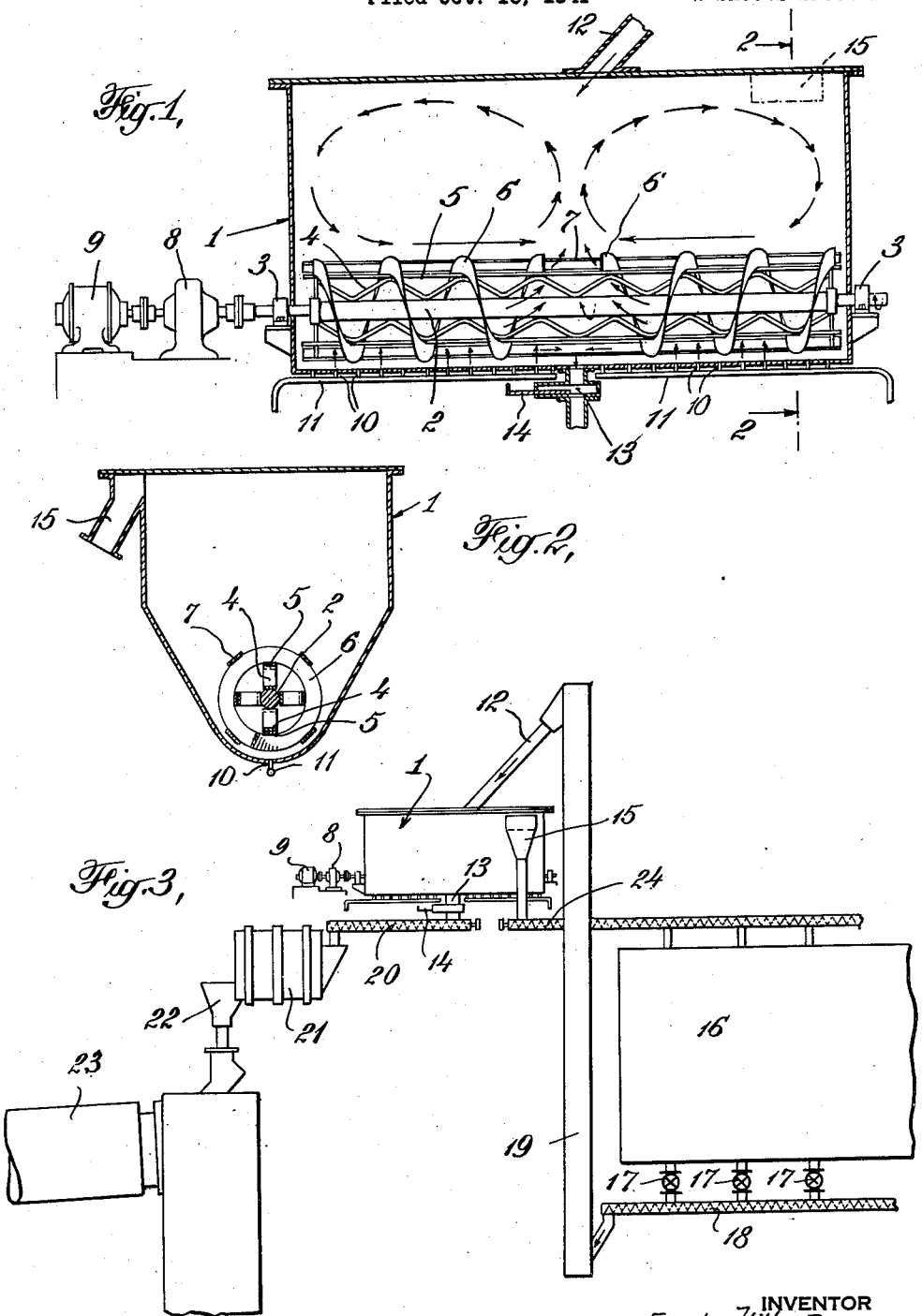

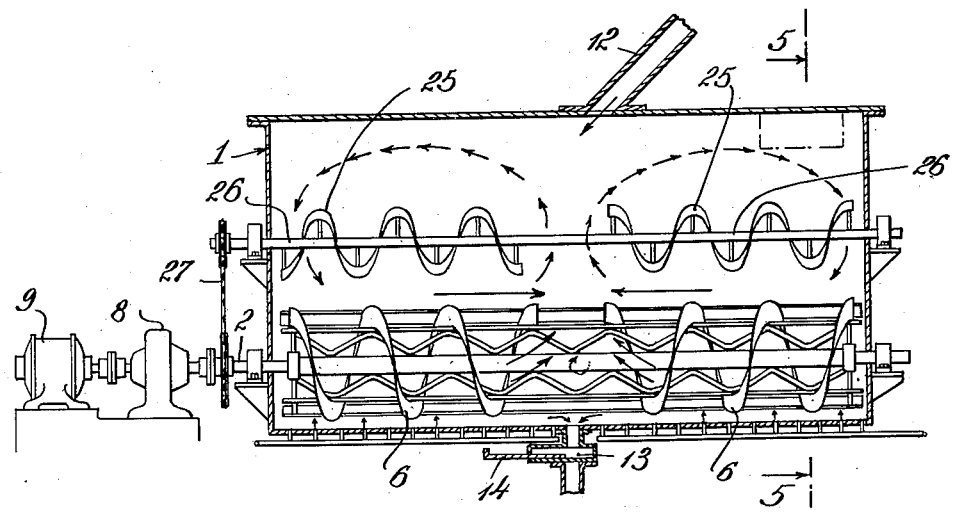
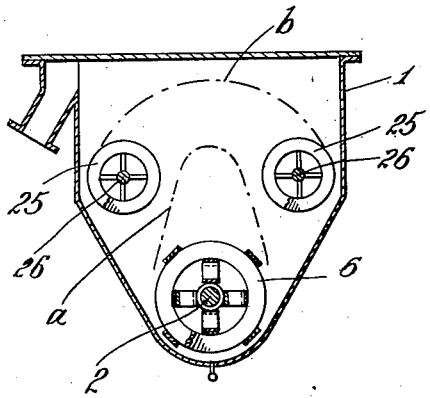

2,320,469

UNITED STATES PATENT OFFICE 2,320,469

MIXING AND HOMOGENIZING APPARATUS

Enok Villy Rasmussen, Copenhagen, Denmark, assignor to F. L. Smidth & Co., New York, N. Y., a corporation of New Jersey Application October 16, 1941, Serial No. 415,333
In Denmark June 24, 1940

2 Claims. (Cl. 259—25)

This invention relates to a method and apparatus for homogenizing and aerating finely divided materials, such as ground cement raw materials, cement, and other similar pulverulent or granular materials.

Finely divided materials must frequently be mixed and blended, or homogenized, as, for example, in the preparation of a mixture of ground cement raw materials suitable for burning into clinker.

It has been proposed to homogenize such a mixture of ground cement raw materials in a tall container, such as a silo or the like, by introducing compressed air into the material to render it fluent and forming and maintaining circulating currents within the fluent material. The circulating currents are effected by one or more mechanical propellers acting throughout the height of the container, or by means of compressed air admitted into the bottom of the container, or by a combination of the two. Due to the shape of the container, the circulating currents are such that the particles of the material travel for the greatest portions of their movement in a generally vertical direction. To insure satisfactory mixing, or homogenizing, it is necessary that the material be subjected to propelling or stirring throughout the height of the container. If the propelling force is applied to the material only at the bottom of the container, the circulating currents will be restricted to the lower portion of the material and the upper portion will not be mixed or homogenized to any appreciable extent. In case the air supply should suddenly fail, the material will settle, and the container will not be ready for use again until the material has been discharged. Even if the bottom of the container is provided with a discharge opening, the settled compact material is not likely to run out through it. The result is that the propelling device, or devices, cannot usually be started again until the material is discharged, and this must ordinarily be effected manually and may require a long time. Moreover, the tall vertical containers are rather expensive in construction and the large propelling devices which must be used have a relatively high power consumption.

According to the present invention the material to be treated is formed into a body of substantially greater horizontal length than its height and width, as by supporting it, during treatment, in a container which is preferably in the form of a trough whose greatest dimension is that of its horizontal longitudinal axis. A suitable gaseous fluid, such as compressed air, is admitted to the container preferably at its bottom to aerate the material and render it fluent. The circulating currents within the body of material may be set up, and maintained, by the air alone or with the aid of one or more mechanical propelling devices. These devices stir or agitate the material and are arranged to apply a force to it which acts horizontally in the direction of the length of the body of the material. Particularly good results are obtained when the substantially horizontal currents thus produced in the material by the propelling device, or devices, are intersected by substantially vertical currents produced by means of compressed air admitted at the bottom of the container.

Several forms of apparatus constructed in accordance with the invention and capable of carrying out the improved method are illustrated in the accompanying drawings in which:

Figure 1 is a longitudinal section of one form of apparatus embodying the invention;

Fig. 2 is a transverse section taken on the line 2—2 of Fig. 1;

Fig. 3 is a diagrammatic representation of certain parts of a cement plant showing how the present apparatus and method fit in with other pieces of apparatus and other steps in the cement plant;

Fig. 4 is a longitudinal section of a modified form of apparatus; and

Fig. 5 is a vertical transverse section taken on the line 5—5 of Fig. 4.

Referring first to Figs. 1 and 2, the apparatus therein illustrated comprises a container 1 which is preferably in the form of a trough. As will be noted from the drawings the greatest dimension of the container is that of its horizontal longitudinal axis, this dimension being greater than either the height or the width of the container. Mounted in the lower part of the container, and extending longitudinally thereof, is a rotatable shaft 2 which may be mounted in bearings 3 located outside of the container. A number of flat metallic strips 4 are bent to the zig-zag shape indicated in Fig. 1 and are welded at one set of the peaks to the shaft 2. A straight metallic strip 5 is welded to the other set of peaks (i. e., the high points) of each of the zig-zag strips 4. The strips 5 are thus held in parallel relation to the shaft 2. Surrounding the strips 5, and fixed to them, are one or more worm blades 6. To the outer edge of the worm blade, or blades, are fixed a number of longitudinally extending metallic strips 7. The latter stir or agitate the material while the worm blade, or blades, propel the material lingtudinally of the container.

The shaft 2 may be driven by means of an electric motor 9 through gearing represented at 8. Compressed air is admitted at the bottom of the container through a series of nozzles 10 supplied from one or more manifold pipes 11.

The finely divided material is supplied to the container 1 through an inlet pipe 12, and after having been treated, is discharged through an opening 13 in the bottom of the container, preferably located mid-way between the ends of the container. This opening may be closed by means of a damper 14 which may, if desired, be operated by remote control. At the upper part of the container there is provided an overflow 15.

Preferably the worm blade is divided into a right-hand section and a left-hand section, as shown in Fig. 1 so as to convey the material from the ends of the container toward a mid-point. Here the two currents of material meet and rise toward the top of the container, then separate again, and move toward the ends of the container, and then move downwardly toward the propeller, as indicated by some of the arrows in Fig. 1. Other arrows in Fig. 1 indicate the transverse currents of air issuing from the nozzles 10.

Fig. 3 shows the above described apparatus in its relation to other equipment in a plant for the manufacture of cement by the dry process. The finished ground raw materials are delivered to the silos 16. While such raw material is made as uniform in composition as possible, fluctuations in the CaCO₃ content frequently occur and it is desirable to correct them. For this purpose the raw material is discharged from several of the silos 16, through valves 17, to a conveyor 18 which conducts the mixture to an elevator 19. The elevator 19 discharges the mixture into the container 1 through the inlet pipe 12 above described. Thorough mixing and homogenizing takes place in this container thus equalizing the fluctuations in the CaCO₃ content. From the container 1 the mixture of raw materials is discharged through the outlet opening 13 and then fed by means of a conveyor 20 into a nodulizing drum 21. The nodulized material is discharged through a funnel 22 into the rotary kiln 23 where it is burnt to produce cement. The overflow 15 of the container 1 communicates with a worm conveyor 24 which returns to the silos 16 any excess of material overflowing from the container 1.

In the plant just described the homogenizing in the container 1 takes place continuously, the agitating and aerating being effected while the fresh material is constantly supplied and while the homogenized material is constantly discharged. If desired, however, the material may be treated in the container 1 in batches, or while the material is only being fed into the container, or only being discharged therefrom.

If the type of apparatus hereinbefore described does not produce the circulating currents throughout the entire body of material but only in a portion thereof, as indicated for example by the broken line a in Fig. 5, additional circulating currents may be produced in those portions of the body of the material which tend to remain quiet by the use of additional worm blades 25 shown in Figs. 4 and 5. These additional worm blades may be mounted on auxiliary shafts 26 driven by means of sprocket chains 27 from the shaft 2. When such additional worm blades are employed, and when they are arranged substantially as shown in Figs. 4 and 5, the circulating currents will be set up and maintained in a larger portion of the body of material, as indicated for instance, by the broken line b in Fig. 5.

It will now be seen that in either type of apparatus the air, or other gaseous fluid, admitted at the bottom of the container aerates and renders fluent the material to be homogenized. The propeller, or propellers, apply a force acting horizontally in the direction of the length of the body of material. They agitate or stir the material and produce relative movements of the individual particles of the material and also produce and maintain circulating currents such that the particles travel for the greatest portions of their movements in horizontal directions. A thorough mixing or homogenizing of the material results.

The improved apparatus and method have many advantages over the above-mentioned silo type of homogenizer and the method usually conducted in it. For instance, movement of the material horizontally along the bottom of a long shallow container will cause circulating currents throughout more of the mass of material than when the material is propelled in a tall vertical container. The mixing and homogenizing is much more efficient in my method, resulting in a shorter time of treatment of the material. For various reasons a shallow trough-like container is less expensive to construct than a tall container such as a silo. The propelling device herein disclosed, owing to its small height, does not occupy as much space as the propeller or propellers used in tall vertical containers, and the power consumption is less. Moreover, should the air supply or the electric current fail, and the homogenizing stop, when using the improved apparatus, the homogenizing can be restarted without the necessity of discharging the material from the container, because the material above the propelling device and the air nozzles has only a shallow depth as distinguished from the deep column of material above the bottom of a tall vertical container. In any event, the material can always be readily discharged when desired from a container of the type herein disclosed, because the propeller, or propellers, are arranged to move the material toward the discharge opening as hereinbefore described, it being always possible to operate the propellers even if the homogenizing ceases and the material settles to the bottom of the container.

I claim:

1. Apparatus for homogenizing and aerating finely divided dry material comprising a container of substantially greater horizontal length than its height and width, a manifold for a gaseous fluid, means for passing gaseous fluid from said manifold into the bottom of said container in a multiplicity of streams to aerate material therein to render it fluent, and means for producing circulation currents in material in said container which are elongated horizontally comprising a shaft extending longitudinally in the lower portion of said container, means for rotating said shaft, a relatively narrow worm blade supported by and rotatable with said shaft and spaced therefrom for moving material in the container longitudinally along the bottom thereof, and longitudinally extending bars secured to the worm blade to agitate and stir the material in the container as the shaft and worm blade are rotated.

2. Apparatus for homogenizing and aerating finely divided dry material comprising a container of substantially greater horizontal length than its height and width, a manifold for a gaseous fluid, means for passing gaseous fluid from said manifold into the bottom of said container in a multiplicity of streams to aerate material therein to render it fluent, and means for producing circulation currents in material in said container which are elongated horizontally, comprising a shaft extending longitudinally in the lower portion of said container, means for rotating said shaft, a pair of relatively narrow worm blades supported in tandem relation by and rotatable with said shaft and spaced therefrom, the pitch of said worm blades being reversed and such that as the worm blades are rotated material in the container is moved longitudinally along the bottom thereof toward the center of the container, and longitudinally extending bars secured to the outer edge of the worm blades to agitate and stir the material in the container as the shaft and worm blades are rotated.

ENOK VILLY RASMUSSEN.